United States Patent
Huber et al.

(10) Patent No.: US 8,387,919 B2
(45) Date of Patent: Mar. 5, 2013

(54) CONVEYOR APPARATUS FOR AN AIRCRAFT CARGO HOLD

(75) Inventors: Thomas Huber, Schliersee (DE); Richard Holzner, Rosenheim (DE)

(73) Assignee: Telair International GmbH (DE)

( * ) Notice: Subject to any disclaimer, the term of this patent is extended or adjusted under 35 U.S.C. 154(b) by 0 days.

(21) Appl. No.: 10/999,164

(22) Filed: Nov. 2, 2004

(65) Prior Publication Data

US 2006/0065786 A1   Mar. 30, 2006

(30) Foreign Application Priority Data

Nov. 3, 2003 (DE) ................... 103 51 200

(51) Int. Cl.
B64D 9/00 (2006.01)

(52) U.S. Cl. .................... 244/137.1; 244/118.1

(58) Field of Classification Search ........ 16/24, 25, 16/26, 46, 74, 48, 366, 35 R; 193/35 A, 35 B, 193/35 MD, 36, 37, 35 C, 35 PE, 35 G; 294/4; 244/118.1, 137.1
See application file for complete search history.

(56) References Cited

U.S. PATENT DOCUMENTS

| | | | | | |
|---|---|---|---|---|---|
| 3,209,880 | A | * | 10/1965 | Dietiker | 193/37 |
| 3,435,938 | A | * | 4/1969 | Spira et al. | 193/37 |
| 3,470,992 | A | | 10/1969 | Lagemann | |
| 3,480,239 | A | * | 11/1969 | Jensen et al. | 410/79 |
| 3,737,022 | A | * | 6/1973 | DeNeefe et al. | 198/782 |
| 3,739,894 | A | * | 6/1973 | Hinman | 193/35 MD |
| 3,741,504 | A | * | 6/1973 | Alberti et al. | 244/137.1 |
| 3,756,544 | A | * | 9/1973 | Bader | 244/137.1 |
| 3,978,975 | A | * | 9/1976 | Herbes et al. | 198/782 |
| 4,050,655 | A | * | 9/1977 | Bogue et al. | 244/137.1 |
| 4,125,183 | A | | 11/1978 | Lang | |
| 4,285,550 | A | | 8/1981 | Blackburn et al. | |
| 4,347,794 | A | * | 9/1982 | Nordstrom | 108/57.15 |
| 4,395,172 | A | * | 7/1983 | Hoener et al. | 410/84 |
| 4,541,768 | A | * | 9/1985 | Walker et al. | 414/535 |
| 4,589,542 | A | | 5/1986 | Steadman | |
| 4,696,583 | A | * | 9/1987 | Gorges | 384/49 |
| 4,780,043 | A | * | 10/1988 | Fenner et al. | 414/502 |
| 4,871,052 | A | * | 10/1989 | Huber | 193/35 MD |
| 5,025,915 | A | * | 6/1991 | Huber | 198/782 |
| 5,033,611 | A | * | 7/1991 | Huber | 198/782 |
| 5,042,645 | A | * | 8/1991 | Pritchard | 198/782 |
| 5,131,527 | A | * | 7/1992 | Huber | 198/782 |
| 5,147,020 | A | * | 9/1992 | Scherman et al. | 193/35 A |
| 5,464,086 | A | * | 11/1995 | Coelln | 193/35 SS |

(Continued)

FOREIGN PATENT DOCUMENTS

DE   1 990 844   8/1968
DE   1 956 946   11/1970

(Continued)

*Primary Examiner* — Benjamin P Lee
(74) *Attorney, Agent, or Firm* — Barnes & Thornburg LLP

(57) ABSTRACT

A conveyor apparatus for use in an aircraft cargo hold a plurality of direction-independent conveyor elements such as ball elements or similar, on which an item of freight such as a container can be transported in a transport plane linearly and with a change of direction. In order to improve the handling of items of freight, in particular to avoid damage, the apparatus comprises at least one brake element, for example in a door region of the cargo hold, in order to brake movement of the item of freight with a predetermined, finite braking force while it is being transported into the cargo hold or out of the cargo hold.

10 Claims, 3 Drawing Sheets

U.S. PATENT DOCUMENTS

| | | | |
|---|---|---|---|
| 5,526,923 A * | 6/1996 | Johansson et al. | 198/722 |
| 5,655,259 A | 8/1997 | Look | |
| 5,906,247 A * | 5/1999 | Inoue | 180/20 |
| 6,131,717 A | 10/2000 | Owen | |
| 6,336,542 B1 * | 1/2002 | Mintonye, II | 193/37 |
| 6,354,424 B1 * | 3/2002 | Rowles | 193/35 A |
| 6,527,097 B2 | 3/2003 | Dreyer | |
| 2002/0104734 A1 * | 8/2002 | Roberts et al. | 193/37 |

FOREIGN PATENT DOCUMENTS

| | | |
|---|---|---|
| DE | 38 05 494 | 8/1989 |
| DE | 197 20 224 A1 | 10/1998 |
| FR | 2 302 939 | 11/1976 |
| GB | 2 043 584 A | 10/1980 |
| GB | 2 275 977 A | 9/1994 |

* cited by examiner

CONVEYOR APPARATUS FOR AN AIRCRAFT CARGO HOLD

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a conveyor apparatus for use in an aircraft cargo hold.

BACKGROUND OF THE INVENTION

In the cargo holds of various types of large aircraft, the cargo is transported by conveyor apparatus with the following components: roller tracks for transport along the axis of the aircraft and at certain sites, in particular in the region of the cargo-hold door or where there is a change in the number of roller tracks from three to two or from two to one (in so-called multidirectional areas), a plurality of ball elements, i.e. direction-independent transport elements, on which containers, pallets or similar items of freight can be shifted and rotated in all directions.

To reduce the risk of accidents it is also known to provide, in the region of the door through which the cargo hold is loaded and in particular at its edges, latch elements that are pressed downward while the load is being transported inward and snap up again when the item of freight has passed, so that the item of freight can no longer be transported outward or fall through the loading door. However, in particular when an aircraft that is to be loaded is standing in an unfavorable position, or the floor of the cargo hold is not horizontal for some other reason, problems can arise, in particular when heavy items of freight are being loaded in the multidirectional areas.

An object of the present invention is to provide a conveyor apparatus for use in a cargo hold of an aircraft that facilitates and improves the loading of items of freight over conventional apparatus.

BRIEF SUMMARY OF THE INVENTION

According to the present invention there is provided a conveyor apparatus for use in an aircraft cargo hold comprising a plurality of direction-independent conveyor elements on which an item of freight can be transported in a transport plane, and at least one brake element adapted to brake movement of said item of freight with a predetermined, finite braking force while it is being transported into the cargo hold and out of the cargo hold. The plurality of direction-independent conveyor elements preferably includes at least one ball element on which an item of freight can be transported linearly in said transport plane and with a change of direction.

The aim of the invention is thus that in a region of the cargo hold in which the main concern was previously that the transport elements should be as smooth-running as possible, now there are also provided brake elements for braking the movement of the items of freight. As a result, in particular in the case of heavy items, the danger of uncontrolled movement of the cargo is reduced.

Preferably, the brake elements are constructed as conveyor elements. Hence on one hand the brake elements serve to support the items of freight on the cargo-hold floor in such a way that they can be transported. On the other hand, the predetermined, finite braking force acts on the items of freight.

In a first alternative, the brake elements are designed as ball elements with braked balls, and thus do not differ in principle from the ball elements that are provided in any case. In another embodiment of the invention the brake elements are designed as swivel casters, such as are previously known and have been identified as "swivel caster 203100-series" for "Airbus" and "Boeing", with braked rollers, which orient themselves in the direction of movement of an item of freight as it is being loaded and moved into the cargo hold. Such swivel casters can be made with relatively broad rollers, so that large surfaces in contact with the items of freight are available for braking with high braking moments. Here the swivel casters are preferably designed with free-wheeling, such that braking of the rollers occurs only in the direction in which the swivel casters are oriented when an item of freight is moving on them.

The brake elements can be constructed such that the braking force can be changed in dependence on a load force that acts on the brake element perpendicular to the transport plane. This corresponds to adjustment of the braking force in dependence on the mass of an item of freight to be braked, in particular in such a way that in the case of items that can be transported in the door region easily and without risk, the braking force applied to them is less than that applied to items with greater mass, which could cause damage to the aircraft or even the cargo personnel if their movements were uncontrolled.

Furthermore, it is preferred for the brake elements to be so constructed that the braking force can be altered in dependence on the transport velocity. Such a design of the brake elements can ensure that the items of freight are not moved at excessively high speeds, which in turn corresponds to a reduction of risk.

Finally, the brake elements are preferably so constructed that the braking force can be turned off when required. Especially when an absolutely horizontal orientation of the transport plane is guaranteed, this can facilitate the loading process.

Preferred embodiments of the invention will now be described by way of example with reference to the accompanying drawings.

DETAILED DESCRIPTION OF THE INVENTION

Figure 1:
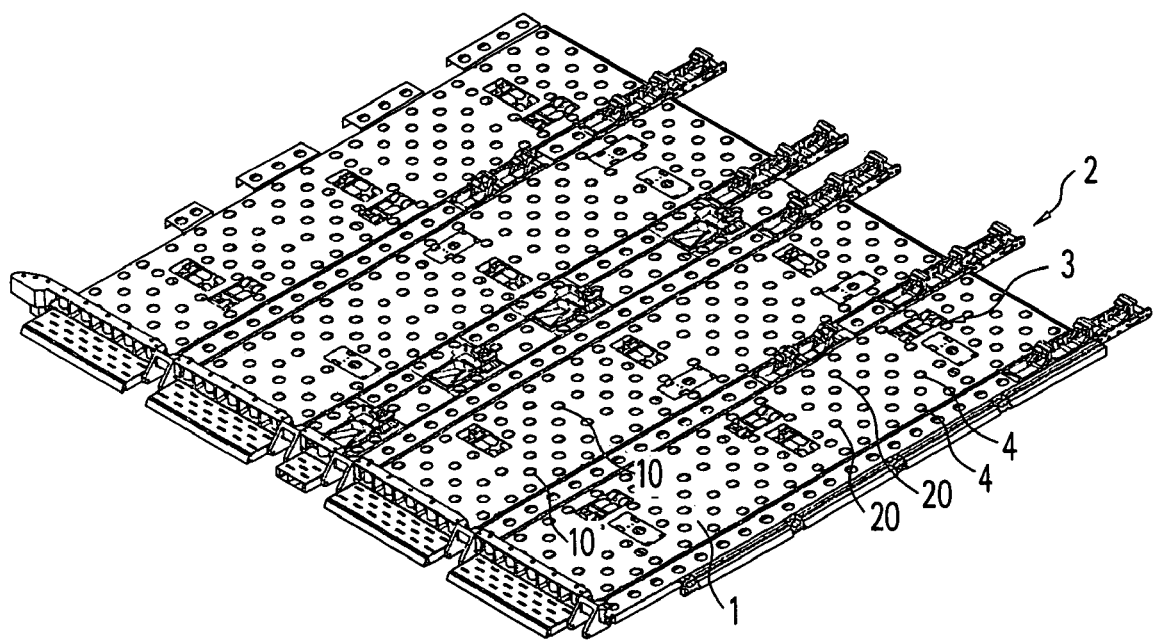
FIG. 1 is a perspective view of a ball mat for use in a cargo hold of an aircraft.

In the following description, the same reference numerals are used for identical parts or parts with identical actions.

As shown in FIG. 1, the conveyor apparatus for an aircraft cargo hold comprises a mat 1 in which are installed a plurality of ball elements 4 and PDUs (power drive units with rollers). Adjacent to each mat 1 roller conveyor tracks 2 are provided, on which items of freight can be propelled in the direction of the roller conveyor tracks 2, whereas in the regions of the ball elements 4 these items of freight can be shifted and rotated in all directions.

In the mat 1, in addition to the ball elements 4, there are also braked ball elements 10 and/or braked swivel casters 20, the positioning of which is only schematically indicated in FIG. 1. In general the braking function proposed here is also ensured if the braked ball elements 10 or braked swivel casters 20 are systematically distributed in the mat 1 at larger distances from one another.

An embodiment of a braked swivel caster 20 will now be explained in greater detail with reference to FIGS. 2, 3 and 4.

Figure 2:
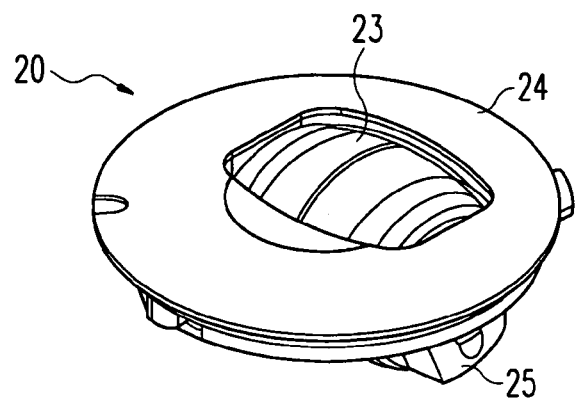
FIG. 2 is a perspective view of a swivel caster.
Figure 3:
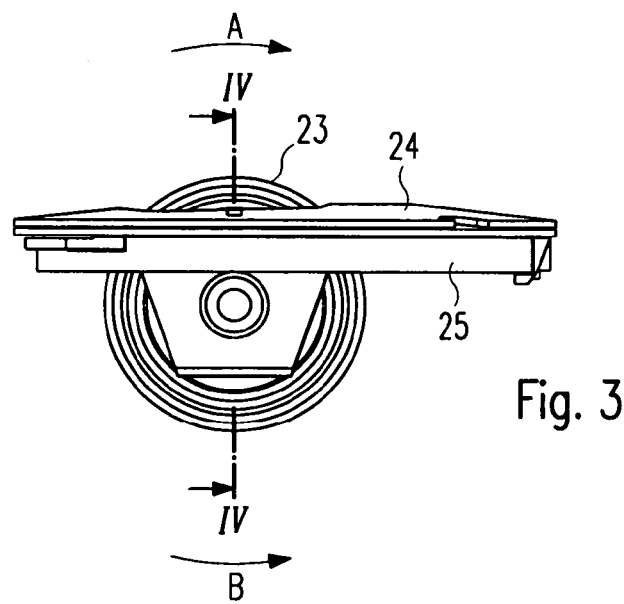
FIG. 3 is a side view of the swivel caster shown in FIG. 2.
Figure 4:
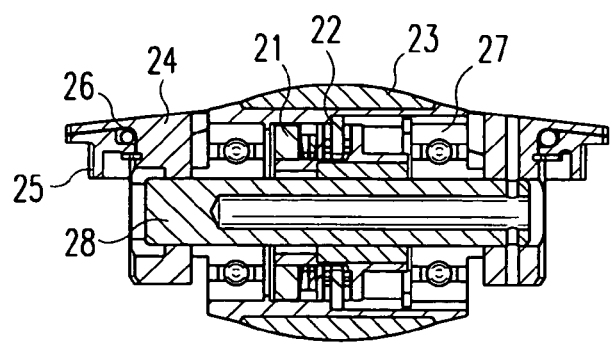
FIG. 4 is a sectional view along the line IV-IV in FIG. 3.

It can be seen in FIGS. 2 and 3 that a braked swivel caster 20 comprises a swivel plate 24, which by way of rotary bearings 26 (see FIG. 4) in a base 25 can be rotated about a vertical axis, i.e. an axis perpendicular to the transport plane. In the swivel plate 24 is seated a roller 23, by way of roller bearings 27 on a shaft 28. The shaft 28 is offset from the vertical axis of rotation of the swivel caster 20 in such a way that when a load travels over the swivel caster 20, the swivel plate 24 is rotated because of the trailing effect between the point at which the roller 23 contacts the item of freight and the vertical axis of rotation of the swivel plate 24, which is defined by the swivel bearing 26. The rotation of the swivel plate 24 is such that the shaft 28 (and hence the axis of rotation of the roller 23) is oriented perpendicular to the direction in which the item of freight passing over the plate is being transported.

Functionally intermediate between the shaft 28 fixedly seated in the base 25 and the roller 23, a brake 22 is attached by way of a free-wheel 21. Its free-wheeling direction is indicated by the arrow A (FIG. 3), so that the brake 22 can have an effect only when the roller 23 is turning in the opposite direction, i.e. in the direction shown by the arrow B in FIG. 3 (and hence in the trailing direction). Therefore an item of freight is braked by the swivel caster shown in FIGS. 2-4 as soon as the latter has been adjusted into its trailing direction.

Figure 5:
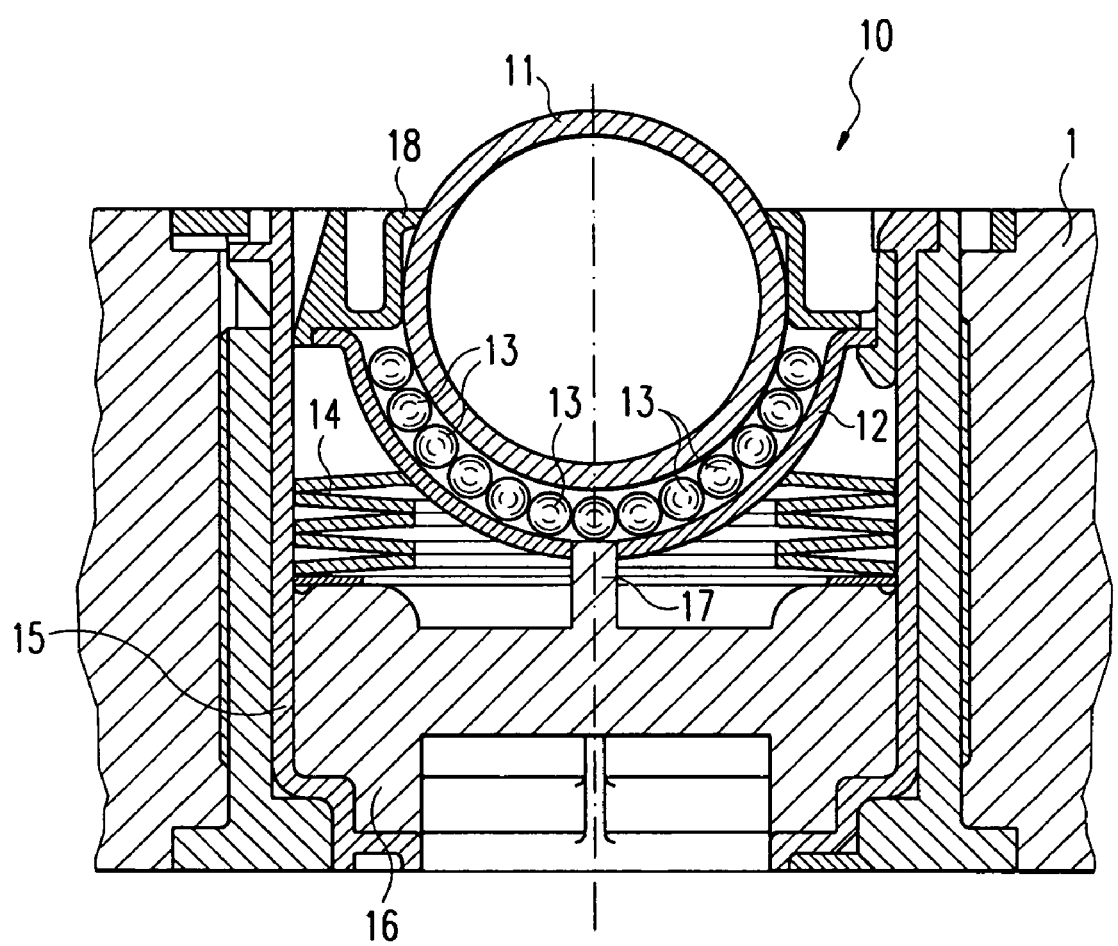
FIG. 5 is a sectional view of a braked ball element.

The braking element shown in FIG. 5 is a ball element 10 such as is known per se, in its basic construction, from the German patent DE 38 05 494. In this ball element 10a ball 11 runs on bearing balls 13 lying in a bearing shell 12. The bearing shell 12 is supported on a spring assembly 14 that is braced against an insert 16 within a housing 15 of the ball element 10. The ball 11 is kept within the housing 15 by a retaining ring 13, and the housing itself is mounted in the mat 1.

From the insert 16a brake finger 17 projects through the bearing shell into the region of the bearing balls 13, in such a way that when a load is applied to the ball 11 from above, pressing the bearing shell 12 downward against the force of the spring assembly 14, the brake finger 17 counteracts the movement of the bearing balls 13 within the bearing shell 12, as a result of which in turn a braking action is exerted on the ball 11. It should be emphasized here that this represents only one of various possible ways of braking the ball 11 more or less strongly, depending on the load being imposed by an item of freight.

Of course it is also possible not to construct the braking device as a conveyor element (according to FIGS. 2-5) but rather to provide a separate brake, for instance in the form of an elastic brake cushion, which then likewise can exert a larger or smaller braking force in dependence on the load. Furthermore, it is possible to design the braked conveyor elements shown in FIGS. 2-5 in such a way that the braking force depends on the transport velocity, i.e. the speed with which the roller 23 and/or the ball 11 rotates. It is also possible for the braking devices to be so constructed that the braking force can be reduced to 0, i.e. the brakes can be inactivated.

LIST OF REFERENCE NUMERALS

1 Mat
2 Roller conveyor belt
3 PDU
4 Ball element
10 Ball element braked
11 Ball
12 Bearing shell
13 Bearing ball
14 Spring assembly
15 Housing
16 Insert
17 Brake finger
18 Retaining ring
20 Swivel caster braked
21 Free-wheel
22 Brake
23 Roller
24 Swivel plate
25 Base
26 Swivel bearing
27 Roller bearing
28 Shaft

The invention claimed is:

1. Passive conveyor apparatus for use in an aircraft cargo hold comprising:
   a support structure;
   a plurality of direction-independent conveyor elements disposed in the support structure and on which an item of freight can be transported in a transport plane,
   at least one braked swivel caster conveyor element disposed in the support structure, wherein the at least one braked swivel caster conveyor element comprises a roller mounted in the plane of the support structure, the roller seated on a shaft having a first end and a second end;
   a swivel plate configured to rotate about a vertical axis wherein the shaft is offset from the vertical axis to orient the roller in a trailing direction with respect to cargo moved along the support structure while the swivel plate provides, at least in part, a surface proximate to a top surface of the support structure, and the surface covers, at least in part, the roller, the first end and the second end of the shaft being seated on the swivel plate;
   wherein the at least one braked swivel caster conveyor element is configured and arranged to brake movement of said item of freight with a predetermined, finite braking force while said item of freight is being transported into the cargo hold and out of the cargo hold wherein the direction-independent and braked swivel caster conveyor elements are not associated with a motor.

2. Conveyor apparatus as claimed in claim 1, wherein said plurality of direction-independent conveyor elements comprise at least one ball element on which an item of freight can be transported linearly in said transport plane and with a change of direction.

3. Conveyor apparatus as claimed in claim 1, wherein said swivel caster further comprises a free-wheel such that braking of the roller occurs only in a trailing direction.

4. Conveyor apparatus as claimed in claim 1, wherein the at least one braked swivel caster conveyor element is configured and arranged such that said predetermined braking force can be altered in dependence on a load force that is applied to said braked swivel caster conveyor element perpendicular to the transport plane of said item of freight.

5. Conveyor apparatus as claimed in claim 1, wherein the at least one braked swivel caster conveyor element is configured and arranged such that said predetermined braking force can be altered in dependence on a transport velocity.

6. Conveyor apparatus as claimed in claim 1, wherein the at least one braked swivel caster conveyor element is configured and arranged such that the braking force can be turned off.

7. Passive conveyor apparatus for use in an aircraft cargo hold comprising:
   a support structure;
   a plurality of direction-independent conveyor elements including a roller disposed in the support structure and on which an item of freight can be transported in a transport plane; and
   a swivel plate configured to cover at least part of the roller;
   a biasing element biasing the roller to a first position away from a braking element,
   wherein the at least one braked conveyor element is configured and arranged to brake movement of said item of freight with a predetermined, finite braking force while said item of freight exerts a force against the biasing element; wherein the direction-independent and braked conveyor elements are not associated with a motor.

8. The conveyor apparatus of claim 7, wherein the braking element includes a brake finger configured to brake the roller when the roller is moved against the biasing element away from the first position.

9. Passive conveyor apparatus for use in an aircraft cargo hold comprising:
   a support structure;
   a plurality of direction-independent conveyor elements disposed in the support structure and on which an item of freight can be transported in a transport plane,
   at least one braked swivel caster conveyor element disposed in the support structure, wherein the at least one braked swivel caster conveyor element comprises a roller mounted in the plane of the support structure;
   a swivel plate configured to rotate to orient the roller in a trailing direction with respect to cargo moved along the support structure while the swivel plate provides, at least in part, a surface proximate to a top surface of the support structure, and the surface covers, at least in part, the roller;
   wherein the at least one braked swivel caster conveyor element is configured and arranged to brake movement of said item of freight with a predetermined, finite braking force while said item of freight is being transported into the cargo hold and out of the cargo hold wherein the direction-independent and braked swivel caster conveyor elements are not associated with a motor;
   wherein said swivel caster further comprises a biasing element biasing the roller to a first position away from a braking element, and a free-wheel such that braking of the roller occurs only in a trailing direction.

10. Passive conveyor apparatus for use in an aircraft cargo hold:
    a support structure;
    a plurality of direction-independent conveyor elements disposed in the support structure and on which an item of freight can be transported in a transport plane,
    at least one braked swivel caster conveyor element disposed in the support structure, wherein the at least one braked swivel caster conveyor element comprises a roller mounted in the plane of the support structure and seated on a shaft;
    a swivel plate configured to freely rotate about a vertical axis, wherein the shaft is offset from the vertical axis to orient the roller in a trailing direction with respect to cargo moved along the support structure while the swivel plate provides, at least in part, a surface proximate to a top surface of the support structure; and
    a biasing element biasing the roller to a first position away from a braking element;
    wherein the at least one braked swivel caster conveyor element is configured and arranged to brake movement of said item of freight with a predetermined, finite braking force while said item of freight is being transported into the cargo hold and out of the cargo hold wherein the direction-independent and braked swivel caster conveyor elements are not associated with a motor.

* * * * *